US009356817B2

(12) United States Patent
Agarwal et al.

(10) Patent No.: US 9,356,817 B2
(45) Date of Patent: May 31, 2016

(54) SYSTEM AND METHOD FOR MITIGATING MULTICAST MESSAGE DUPLICATION IN A WIRELESS NETWORK

(75) Inventors: Gopal Agarwal, Bangalore (IN); Manas Sharma, Bangalore (IN); Manoj Gupta, Bangalore (IN)

(73) Assignee: ARUBA NETWORKS, INC., Sunnyvale, CA (US)

(*) Notice: Subject to any disclaimer, the term of this patent is extended or adjusted under 35 U.S.C. 154(b) by 605 days.

(21) Appl. No.: 13/460,819

(22) Filed: Apr. 30, 2012

(65) Prior Publication Data

US 2013/0286921 A1    Oct. 31, 2013

(51) Int. Cl.
| H04H 20/71 | (2008.01) |
| H04L 29/06 | (2006.01) |
| H04L 12/927 | (2013.01) |
| H04L 12/741 | (2013.01) |
| H04L 12/46 | (2006.01) |
| H04L 12/761 | (2013.01) |

(52) U.S. Cl.
CPC .......... *H04L 29/0653* (2013.01); *H04L 45/745* (2013.01); *H04L 47/806* (2013.01); *H04L 12/4645* (2013.01); *H04L 45/16* (2013.01)

(58) Field of Classification Search
None
See application file for complete search history.

(56) References Cited

U.S. PATENT DOCUMENTS

| 6,754,211 | B1* | 6/2004 | Brown | 370/389 |
| 7,356,841 | B2* | 4/2008 | Wilson | H04L 12/2856 370/389 |
| 9,135,092 | B2* | 9/2015 | Cardona | G06F 9/542 |
| 2003/0165140 | A1* | 9/2003 | Tang et al. | 370/393 |
| 2005/0025160 | A1 | 2/2005 | Meier et al. | |
| 2005/0220096 | A1* | 10/2005 | Friskney | H04L 12/4645 370/389 |
| 2006/0146857 | A1* | 7/2006 | Naik et al. | 370/432 |
| 2007/0076694 | A1* | 4/2007 | Iyer et al. | 370/352 |
| 2007/0081477 | A1* | 4/2007 | Jakkahalli | H04L 12/4645 370/310 |
| 2009/0290524 | A1* | 11/2009 | Seok | 370/312 |
| 2010/0202452 | A1* | 8/2010 | Ram et al. | 370/390 |
| 2012/0147743 | A1* | 6/2012 | Singh et al. | 370/230 |
| 2013/0028133 | A1* | 1/2013 | Narasimhan | 370/254 |
| 2013/0188625 | A1* | 7/2013 | Setia et al. | 370/338 |

OTHER PUBLICATIONS

European Application No./Patent No. 132725104.1; Extended European Search Report; Mailed Sep. 17, 2013.

Cisco: "WLC 7.2 VLAN Select and Multicast Optimization Features Deployment Guide", Cisco Troubleshooting Technotes, Mar. 13, 2012, pp. 1-13, XP002710712, Retrieved from the Internet: URL:http://www.cisco.com/image/gif/paws/113465/vlan-select-dg-00.pdf [retrieved on Aug. 7, 2013] * p. 2 * * p. 6 * * p. 11, paragraph 5 - p. 12 *.

(Continued)

*Primary Examiner* — Michael J Moore, Jr.
(74) *Attorney, Agent, or Firm* — Mannava & Kang, P.C.

(57) ABSTRACT

According to one embodiment of the invention, a method for mitigating duplication of multicast data streams to wireless client devices. The method comprises the operations of detecting, by one or more network devices, a multicast message, and controlling, by the one or more network devices, a forwarding of information within the multicast message to a network device handling multicast data transmissions. The forwarding is controlled based on information within the multicast message and the presence of such information in prior established data structure.

24 Claims, 19 Drawing Sheets

(56) References Cited

OTHER PUBLICATIONS

Cisco: "WLC 7.2 VLAN Select and Multicast Optimization Features Deployment Guide", Cisco Troubleshooting Technotes, Mar. 13, 2012, pp. 1-13, XP002710712, Retrieved from the Internet: URL:http://www.cisco.com/image/gif/paws/113465/vlan-select-dg-00.pdf [retrieved on Aug. 7, 2013].

European Application No./Patent No. 13275104.1; Extended European Search Report; Mailed Aug. 22, 2013.

* cited by examiner

| BSSID | VLAN POOL NAME |
|---|---|
| BSSID_1 | PARAMETERS <...VLAN_POOL_NAME...> |
| ⋮ | ⋮ |

*FIG. 4A*

| VLAN POOL NAME | PRIMARY VLAN (PV) |
|---|---|
| VLAN_POOL_NAME 425 | VLAN_ID_1 450 |
|  |  |

*FIG. 4B*

| MULTICAST GROUP | BSSID | PRIMARY_VLAN | NUM_MEMBERS |
|---|---|---|---|
| GROUP ADDRESS ($G_X$) | BSSID ($B_Z$) | PRIMARY VLAN ($PV_Y$) | COUNT VALUE |

FIG. 4C

| GROUP | PRIMARY VLAN | BSSID | NUM_MEMBERS |
|---|---|---|---|
| G1 | PV1 | B1 | 1 |

| GROUP | PRIMARY VLAN | BSSID | NUM_MEMBERS |
|---|---|---|---|
| G1 | PV1 | B1 | 1 |
| G2 | PV1 | B2 | 1 |

| GROUP | PRIMARY VLAN | BSSID | NUM_MEMBERS |
|---|---|---|---|
| G1 | PV1 | B1 | 2 |
| G2 | PV1 | B2 | 1 |

| GROUP | PRIMARY VLAN | BSSID | NUM_MEMBERS |
|---|---|---|---|
| G1 | PV1 | B1 | 2 |
| G2 | PV1 | B2 | 1 |
| G1 | PV2 | B4 | 1 |

| | GROUP | PRIMARY VLAN | BSSID | NUM_MEMBERS |
|---|---|---|---|---|
| 1200 | G1 | PV1 | B1 | 2 |
| 1210 | G2 | PV1 | B2 | 1 |
| 1220 | G1 | PV2 | B4 | 2 |

FIG. 12E

| | GROUP | PRIMARY VLAN | BSSID | NUM_MEMBERS |
|---|---|---|---|---|
| 1200 | G1 | PV1 | B1 | 2 |
| 1210 | G2 | PV1 | B2 | 1 |
| 1220 | G1 | PV2 | B4 | 3 |

FIG. 12F

| | GROUP | PRIMARY VLAN | BSSID | NUM_MEMBERS |
|---|---|---|---|---|
| 1200 | G1 | PV1 | B1 | 2 |
| 1210 | G2 | PV1 | B2 | 1 |
| 1220 | G1 | PV2 | B4 | 3 |
| 1230 | G2 | PV1 | B7 | 1 |

FIG. 12G

| | GROUP | PRIMARY VLAN | BSSID | NUM_MEMBERS |
|---|---|---|---|---|
| 1200 | G1 | PV1 | B1 | 2 |
| 1210 | G2 | PV1 | B2 | 1 |
| 1220 | G1 | PV2 | B4 | 3 |
| 1230 | G2 | PV1 | B7 | 2 |

FIG. 12H

| | GROUP | PRIMARY VLAN | BSSID | NUM MEMBERS |
|---|---|---|---|---|
| 1200 | G1 | PV1 | B1 | 2 |
| 1210 | G2 | PV1 | B2 | 1 |
| 1220 | G1 | PV2 | B4 | 3 |
| 1230 | G2 | PV1 | B7 | 2 |
| 1240 | G1 | PV1 | B7 | 1 |

FIG. 12I

| | GROUP | PRIMARY VLAN | BSSID | NUM MEMBERS |
|---|---|---|---|---|
| 1200 | G1 | PV1 | B1 | 2 |
| 1220 | G1 | PV2 | B4 | 3 |
| 1230 | G2 | PV1 | B7 | 2 |
| 1240 | G1 | PV1 | B7 | 1 |

FIG. 12J

| | GROUP | PRIMARY VLAN | BSSID | NUM MEMBERS |
|---|---|---|---|---|
| 1200 | G1 | PV1 | B1 | 2 |
| 1220 | G1 | PV2 | B4 | 2 |
| 1230 | G2 | PV1 | B7 | 2 |
| 1240 | G1 | PV1 | B7 | 1 |

FIG. 12K

| | GROUP | PRIMARY VLAN | BSSID | NUM_MEMBERS |
|---|---|---|---|---|
| 1200 ~ | G1 | PV1 | B1 | 2 |
| 1220 ~ | G1 | PV2 | B4 | 1 |
| 1230 ~ | G2 | PV1 | B7 | 2 |
| 1240 ~ | G1 | PV1 | B7 | 1 |

FIG. 12L

| | GROUP | PRIMARY VLAN | BSSID | NUM_MEMBERS |
|---|---|---|---|---|
| 1200 ~ | G1 | PV1 | B1 | 2 |
| 1230 ~ | G2 | PV1 | B7 | 2 |
| 1240 ~ | G1 | PV1 | B7 | 1 |

FIG. 12M

SYSTEM AND METHOD FOR MITIGATING MULTICAST MESSAGE DUPLICATION IN A WIRELESS NETWORK

FIELD

Embodiments of the present disclosure relate to the field of network communications, and in particular a system and method for mitigating multicast message duplication caused by virtual local area network (VLAN) pooling in a wireless network such as a wireless local area network (WLAN) operating in accordance to the IEEE 802.11 Standard.

BACKGROUND

Currently, it is common for enterprise networks to utilize virtual local area networks (hereinafter referred to as "VLANs"). A "VLAN" is a group of client devices that are adapted to communicate as if these devices were connected to the same broadcast domain irrespective of their actual physically location. Configured through software rather than hardware, VLANs provide flexibility as to allow a client device, without any hardware reconfiguration, to retain its membership on the same VLAN even though it is physically moved from one location to another.

VLAN pooling is an abstraction of the assignment of client devices to different VLANs. Currently, one issue with VLAN pooling is that it may cause the transmission of duplicate multicast streams over a wireless shared media. In infrastructure mode, when VLAN pooling is used, wireless client devices for a particular Basic Service Set (BSS), which is identified by a specific BSS Identifier (BSSID), may be randomly allocated to one or more different VLANs. Hence, wireless client devices on the same BSSID but assigned to different VLANs will likely receive duplicate multicast streams.

More specifically, an upstream multicast router sends a copy of a multicast stream for each VLAN for which a wireless client device has registered to receive multicast packets. These duplicated multicast streams are routed to an access point (AP) of a targeted BSS for wireless transmission. As a result, wireless client devices on the same BSSID and different VLANs will receive duplicate multicast streams for the same multicast group.

Based on current VLAN pooling operations, it is quite possible for multiple client devices in the same multicast group to end up on different VLANs. In a worst case scenario, for a VLAN pool with "n" VLANs, the multicast router will provide "n" copies of multicast streams for transmission via the AP. Such duplication leads to a substantial increase in over-the-air channel utilization, resulting in a waste of wireless spectrum.

A method of mitigating multicast stream duplication when using VLAN pooling techniques is needed.

BRIEF DESCRIPTION OF THE DRAWINGS

Embodiments of the present disclosure are illustrated by way of example, and not by way of limitation, in the figures of the accompanying drawings and in which:

FIG. 4A is an exemplary embodiment of the VLAN Pool_name mapping table for maintaining correspondence between a BSSID and a name assigned to the VLAN pool (VLAN_Poolname) within the BSSID.

FIG. 4B is an exemplary embodiment of the Primary VLAN mapping table for maintaining correspondence between the name assigned to the VLAN pool (VLAN_Poolname) and the VLAN identifier assigned as the particular VLAN pool (Primary VLAN).

FIG. 4C is an exemplary embodiment of the Multicast VLAN mapping table for maintaining information associated with different network devices including their multicast group, associated Primary VLAN, Basic Service Set Identifier (BSSID) and number of similarly situated members.

FIGS. 12A-12M are exemplary embodiments of resultant Multicast VLAN tables based on operations performed by VLAN pooling stream control logic upon detection of JOIN and/or LEAVE messages.

DETAILED DESCRIPTION

Figure 1:
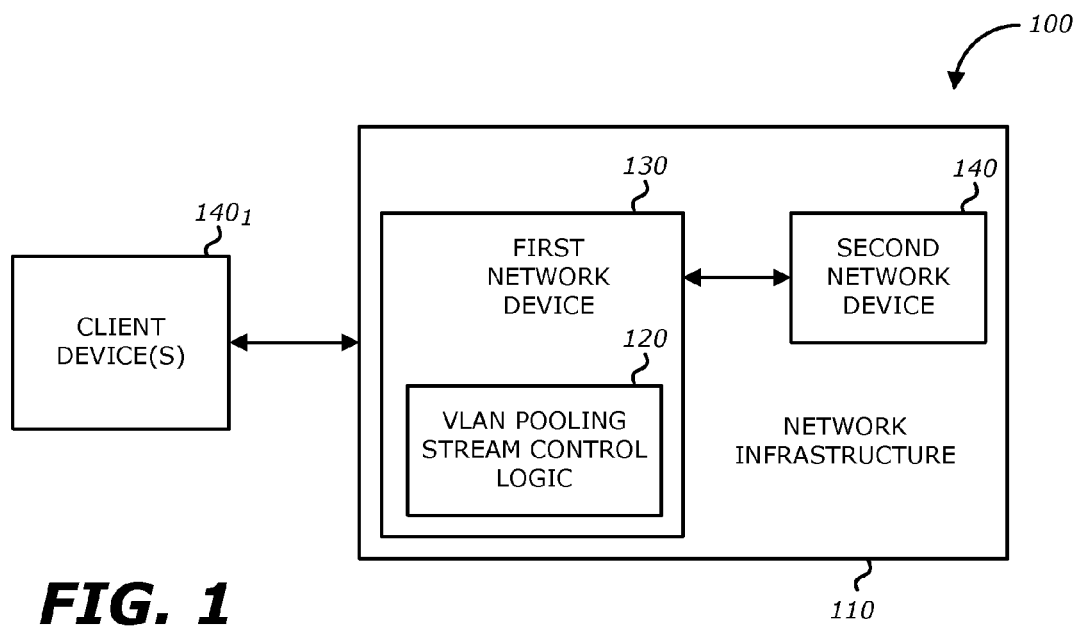
FIG. 1 is a general block diagram of a network supporting virtual local area network (VLAN) pooling.

In the following description, several specific details are presented to provide a thorough understanding of the invention. While the context of the disclosure is directed to VLAN pooling stream control logic that is configured to mitigate multicast message duplication, one skilled in the relevant art may recognize, however, that the concepts and techniques disclosed herein can be practiced without certain details such as the exclusion of one or more operations, logic elements, or the like.

Herein, certain terminology is used to describe features for embodiments of the disclosure. For example, the term "network device" generally refers to any device that includes logic configured to communicate with a network and/or process information related to such communications. Different categories of network devices may include, but are not limited or restricted to (1) a client device being any consumer electronics with wireless network connectivity (e.g., tablet; laptop; desktop; netbook; television; set-top box; video gaming control; mobile handset with cellular and/or wireless connectivity such as a smartphone, personal digital assistant "PDA"; etc.); (2) an access point; (3) a data control device (e.g., network switch, controller, etc.); (4) a multicast router; or the like. Hence, a "wireless" client device has wireless connectivity to the network.

It is contemplated that a network device includes hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "interconnect" is broadly defined as a logical or physical communication path such as, for instance, electrical wire, optical fiber, cable, bus trace, or a wireless channel using infrared, radio frequency (RF), or any other wireless signaling mechanism. The term "message" constitutes a grouping of data, which may be placed in the form of a packet, a stream (e.g., a sequence of packets), a frame, an Asynchronous Transfer Mode (ATM) cell, or any other series of bits having a prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the present disclosure.

General Network Architecture

Referring to FIG. 1, a general block diagram of a network 100 supporting multiple Basic Service Set Identifiers (BSSIDs) along with virtual local area network (VLAN) pooling is shown. As described, VLAN pooling is an abstraction of the assignment of client devices to different VLANs, which may be managed by a network device implemented within network infrastructure 110 such as a controller, an access point or another type of network device.

Herein, network infrastructure 110 is a collection of network devices that are adapted to support communications with one or more network devices (e.g., client device $140_1$). The components formulating network infrastructure 110 may vary, depending on the selected network architecture. For example, according to one embodiment of the disclosure, network infrastructure 110 is implemented with VLAN pooling stream control logic 120 that mitigates multicast message duplication over a wireless medium. This reduction in multicast message duplication is accomplished by using a single unique identifier for each VLAN pool and controlling the exchange of messages between network devices within network infrastructure 110 as described below.

More specifically, as an illustrative embodiment, a first network device 130 within network infrastructure 110 is implemented with VLAN pooling stream control logic 120, which is configured to select a unique identifier for each VLAN pool. Each unique identifier, referred to herein as the "Primary VLAN," is a VLAN identifier (VLAN ID) for one of a plurality of VLANs forming that VLAN pool. As all VLANs forming the VLAN pool are now mapped to their corresponding Primary VLAN, first network device 130 receives a single multicast message for transmission to wireless client devices within a particular BSSID, even though these client devices are on different VLANs.

Furthermore, after configuration of infrastructure network 110 in which a Primary VLAN is assigned to each VLAN pool and such mapping is stored, first network device 130 also controls a process for routing control messages used by a second network device 140 to formulate and maintain multicast group memberships. These control messages may include a request to join a particular multicast group (e.g. JOIN message) or a request to leave a particular multicast group (e.g. LEAVE message). First network device 130 suppresses the routing of JOIN and/or LEAVE messages in accordance with forwarding decision processes described below.

Until now, VLAN pooling management has failed to avoid duplication of multicast messages to those wireless client devices that belong to the same BSSID but are members of different VLANs. However, by configuring first network device 130 to associate a single, unique VLAN ID (e.g. the Primary VLAN) to a corresponding VLAN pool and controlling upstream routing of the incoming JOIN and/or LEAVE messages, multicast message duplication can be mitigated.

Figure 2A:
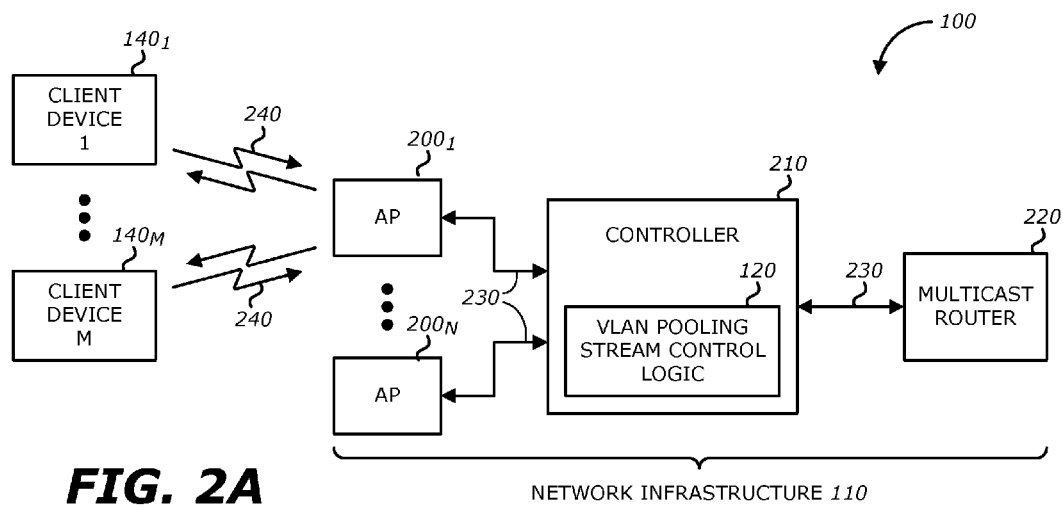
FIG. 2A is a first exemplary block diagram of a wireless network featuring network infrastructure with VLAN pooling stream control logic that mitigates duplication of multicast messages.

For instance, according to one embodiment of the disclosure illustrated in FIG. 2A, where network 100 is a wireless local area network (WLAN), network infrastructure 110 comprises one or more access points (APs) $200_1$-$200_N$ (N≥1) that are coupled to a controller 210 and a multicast router 220 over an interconnect 230. Herein, AP $200_1$ is configured to establish communications with wireless network devices within its coverage area such as wireless client device $140_1$-$140_m$ (M≥1) for example.

Controller 210 comprises VLAN pooling stream control logic 120 that is configured to monitor for certain types of messages 240 received by AP $200_1$-$200_N$ from wireless client devices $140_1$-$140_m$ and, in various situations, extract information from these messages 240 for controlling wireless delivery of multicast messages. These types of monitored messages 240 may include, but are not limited or restricted to signaling that includes an Internet Group Management Protocol (IGMP) JOIN message, an IGMP LEAVE message, a Multicast Listener Discovery (MLD) JOIN message, a MLD LEAVE message, or the like.

Figure 2B:
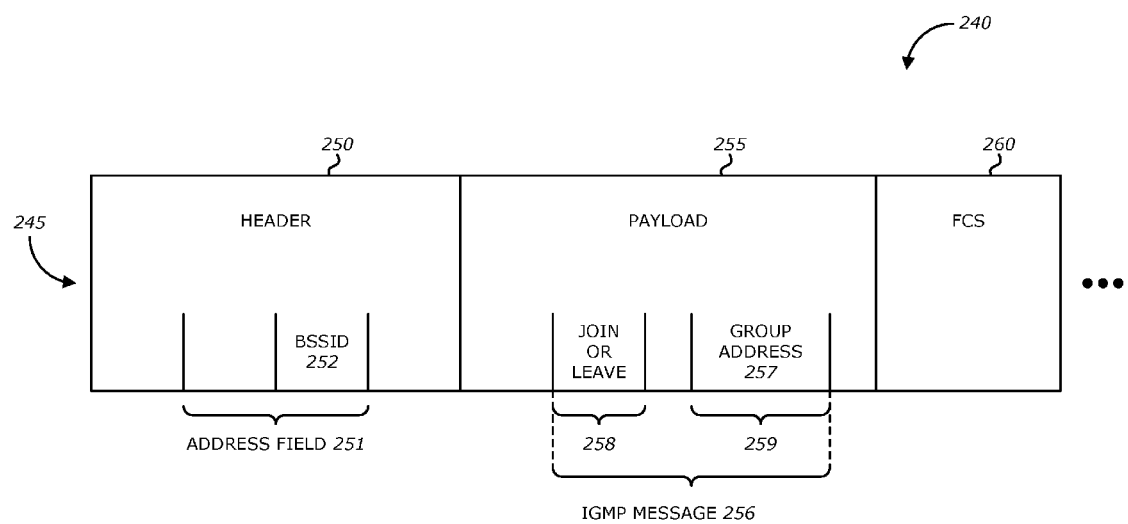
FIG. 2B is an exemplary data structure diagram of a wireless message encapsulating an IGMP message monitored by a network device within the network infrastructure of FIG. 2A.

For instance, as shown in FIG. 2B, according to one embodiment of the disclosure, message 240 comprises one or more wireless frames 245, where each wireless frame 245 is configured in accordance with a wireless communication standard, such as the Institute of Electrical and Electronics Engineers (IEEE) 802.11 Standard for example. More specifically, frame 245 comprises a header 250, a payload 255 and a frame check sequence (FCS) 260.

More specifically, header 250 includes address fields 251 that are adapted to include a BSSID 252. BSSID 252 identifies the BSS in which the wireless client device $140_1$ of FIG. 2A resides. BSSID 252 may be extracted from message 240 by a network device within network infrastructure 110.

Furthermore, besides BSSID 252, a multicast group address 257 may be extracted from an IGMP message 256 encapsulated within payload 255 of frame 245. IGMP message 256 includes a type field 258 that identifies if the IGMP message is a JOIN or LEAVE message and a group address field 259 for containing multicast group address 257.

Referring to both FIGS. 2A and 2B, using BSSID 252, network infrastructure 110 is able to ascertain the Primary VLAN that, established during a configuration stage for network infrastructure 110, represents the VLAN pool supported by BSSID 252. By collecting BSSID 252, the Primary VLAN and multicast group address 257, network infrastructure 110 is able to determine whether incoming information should be used to populate one or more data structures that are accessed by controller 210 in controlling upstream and/or downstream messaging with multicast router 220. For instance, based on the stored contents within the data structure(s), controller 210 determines whether incoming message 240 should be routed upstream to multicast router 220.

Multicast router 220 is a network device that is responsible for transmitting multicast data streams to targeted Primary VLANs. To accomplish such transmissions, multicast router 220 would be adapted with a client membership table (not shown) that features a plurality of fields for each entry. These fields may include, but are not limited or restricted to Primary VLAN, multicast group address, message type/version and port number.

Figure 2C:
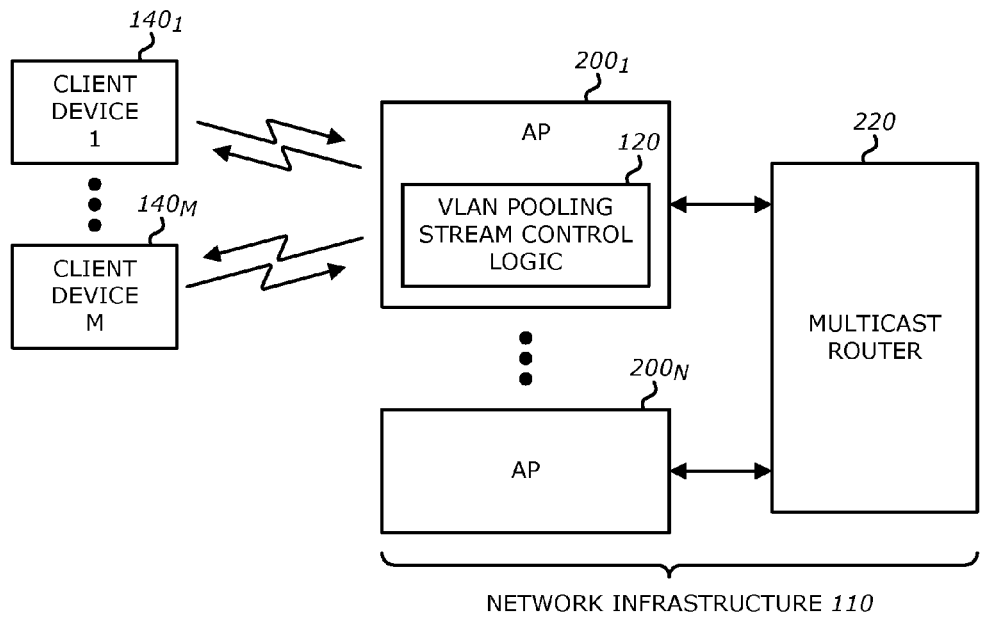
FIG. 2C is a second exemplary block diagram of a wireless network featuring network infrastructure with VLAN pooling stream control logic that mitigates duplication of multicast messages.

Referring now to FIG. 2C, another exemplary block diagram of network 100 supporting VLAN pooling is shown. Herein, in lieu of relying on a separate controller 210 to monitor for JOIN and/or LEAVE messages from client devices $140_1$-$140_m$ as shown in FIG. 2A, the functionality of controller 210 is integrated into at least AP $200_1$. Therefore, adapted with VLAN pooling stream control logic 120, AP $200_1$ monitors for JOIN and/or LEAVE messages from client devices $140_1$-$140_m$, and upon detecting such messages, AP $200_1$ extracts data to populate data structures that are relied upon to control upstream/downstream routing of multicast-related messages. These data structures include, but are not limited or restricted to a Primary VLAN table and a Multicast VLAN table as described below.

Figure 2D:
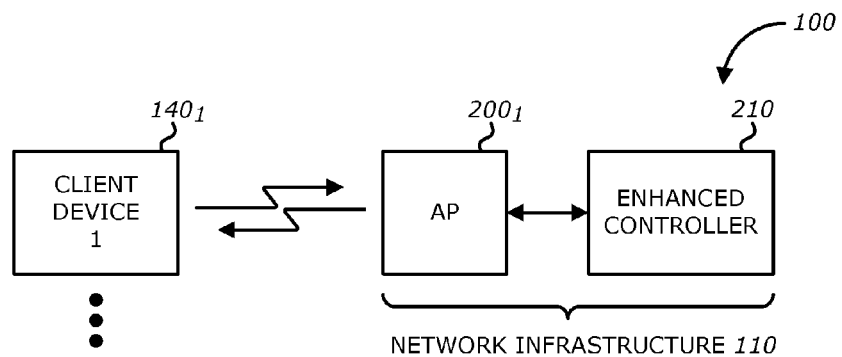
FIG. 2D is a third exemplary block diagram of a wireless network featuring network infrastructure with VLAN pooling stream control logic that mitigates duplication of multicast messages.

Referring to FIG. 2D, another detailed exemplary block diagram of network 100 supporting VLAN pooling is shown. Herein, in lieu of relying on a separate multicast router 220 to transmit multicast streams to client devices $140_1$-$140_M$, the functionality of multicast router 220 is integrated into controller 210. Therefore, adapted with VLAN pooling stream control logic 120, controller 210 monitors for certain types of messages (e.g., JOIN and LEAVE messages) from client devices $140_1$-$140_M$. Upon detecting such messages, controller 210 extracts data to populate data structures that are relied upon to control the routing of outgoing multicast messages.

Figure 3:
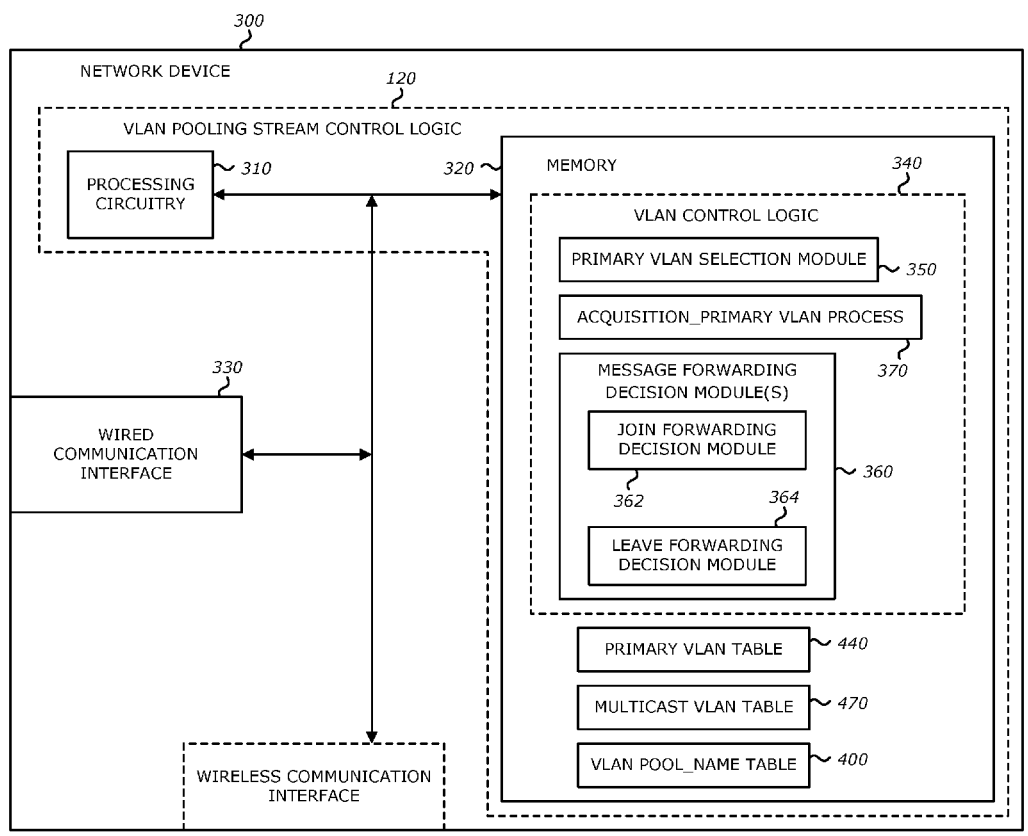
FIG. 3 is an exemplary diagram of a network device with functionality for mitigation and perhaps elimination of multicast message duplication for VLAN pooling.

Referring to FIG. 3, an exemplary diagram of a network device 300 with functionality for mitigation and perhaps elimination of multicast message duplication for VLAN pooling is shown. Herein, network device 300 (e.g., controller, AP, etc.) comprises VLAN pooling stream control logic 120. According to one embodiment of the invention, VLAN pooling stream control logic 120 includes processing circuitry 310 and memory 320, which are coupled to one or more interfaces 330 that enable network device 300 to communicate with other network devices. For instance, interface 330 may be implemented as a physical interface including one or more ports for wired connectors. Additionally, or in the alternative, interface 330 may be implemented as an antenna unit for transmitting and/or receiving wireless signals from other network devices.

As shown in FIG. 3, according to one embodiment of the disclosure, processing circuitry 310 is coupled to memory 320 for execution of VLAN control logic 340 which is stored in memory 320. VLAN control logic 340 comprises a first module 350 configured to control the selection of a Primary VLAN associated with each VLAN pool (hereinafter referred to as "Primary VLAN Selection module" 350) and one or more modules 360 configured to control forwarding decisions for certain types of messages (e.g., JOIN and/or LEAVE messages) received by network device 300 as described below. As shown, a JOIN Forwarding Decision module 362 and a LEAVE Forwarding Decision module 364 may be deployed as part of VLAN control logic 340. Also, VLAN control logic 340 comprises an Acquisition Primary VLAN (APV) module 370 that acquires the Primary VLAN as described below.

Data Structure Formulation During Device Configuration

Referring to FIGS. 3 and 4A-4C, during network configuration, one or more data structures are formulated to create a logical mapping between a BSSID and a Primary VLAN selected as a representative VLAN ID for a VLAN pool. According to one embodiment of the disclosure, this logical mapping is provided through a plurality of data structures, namely a first data structure 400 and a second data structure 440. These data structures 400 and 440 are illustrated as tables, but it is contemplated that other data structure formats may be used.

Stored in memory 320 and illustrated in FIG. 4A, first data structure 400 (hereinafter referred to as "VLAN Pool_name table") is populated during initial configuration of network device 300 in order to maintain a mapping between multiple BSSIDs 410 supported by the network and a set of configuration parameters 420 associated with each BSSID. For instance, a first entry 430 of data structure 400 includes a first BSSID (BSSID_1) along with a set of configuration parameters (Parameters <>) corresponding to BSSID_1. One of the configuration parameters includes a VLAN_pool_name_425, which is the alphanumeric name (or data representative of the name) assigned to a VLAN pool supported by BSSID_1. Hence, VLAN Pool_name_table 400 enables network device 300, after extracting BSSID_1 from a JOIN or LEAVE message received from a client device, to determine the VLAN pool name.

Figures 4A, 4B:
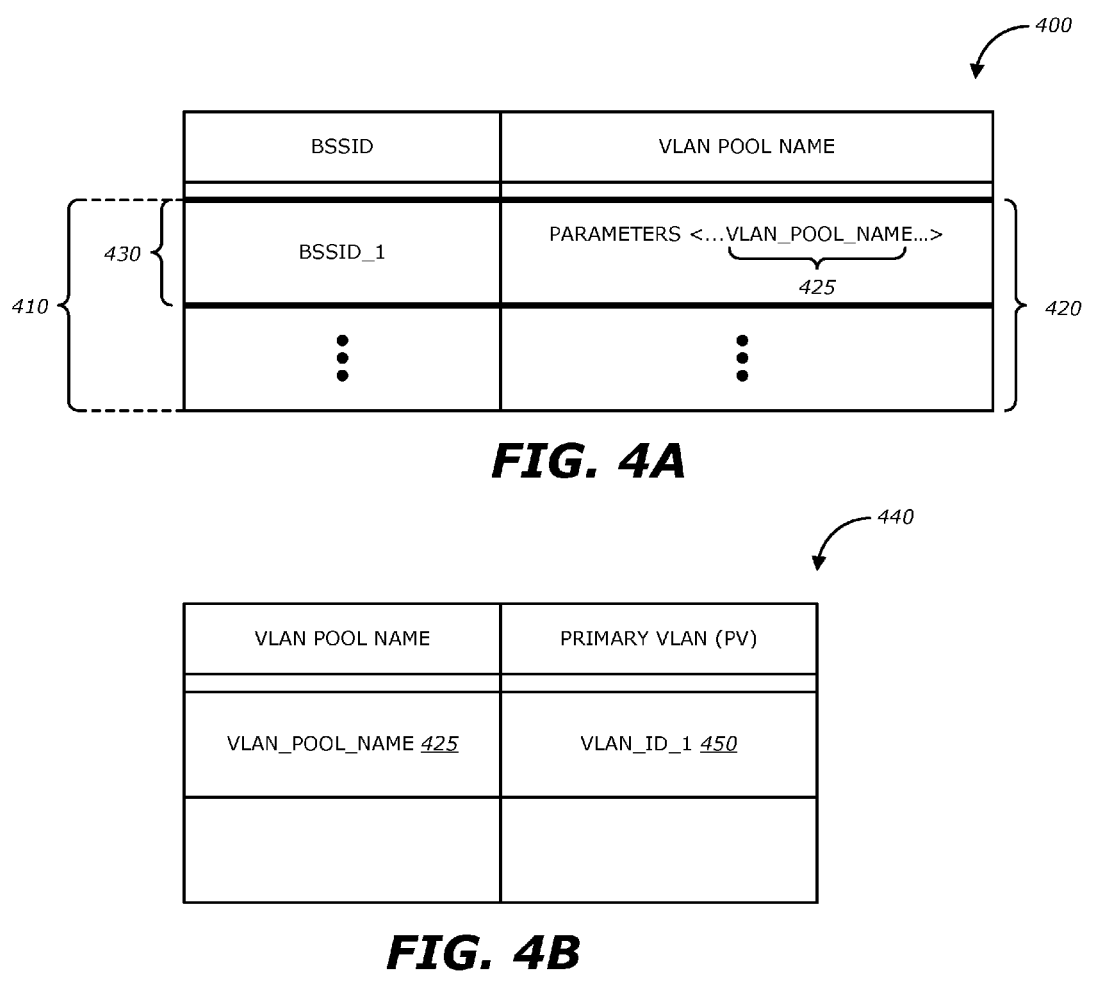

Also stored in memory 320 and illustrated in FIG. 4B, second data structure 440 is populated during device configuration in order to maintain a mapping between a VLAN pool name (e.g., VLAN_pool_name 425) and a Primary VLAN 450 (e.g., VLAN_ID_450) associated with VLAN_pool_name 425. The pseudo-code outlining the selection of the Primary VLAN from VLANs within a corresponding VLAN pool identified by the VLAN pool name and describing operations performed by Primary VLAN Selection module 350 of FIG. 3 during execution is set forth below in Table 1.

Herein, three types of data structures are used for Primary VLAN selection. These data structures include a VLAN pool represented as a sorted array of VLAN IDs ($P_j$); a flag for the VLAN pool being represented as a Boolean ($F_j$); and an intermediate VLAN pool being represented as a sorted array of VLAN IDs ($T_j$).

Furthermore, each flag is assigned a state from among a plurality of states. For illustrative purposes, the states for each flag include the following: (i) 'E'—Exclusive; (ii) 'I'—Intersection; (iii) 'S'—Subset; and (iv) 'O'—Overlap. An order of priority for the flag states is defined in the increasing order—'E'<'I'<'S'<'O'. For instance, a flag assigned to an 'S' state cannot be reassigned to an 'I' state during a next iteration of operations by Primary VLAN selection module 350. Rather, the flag can be updated only with a higher priority state such as an 'O' state.

The priority state assigned to the flag identifies what "action" is to be taken after a comparison is performed on the contents within two different VLAN pools. For this illustrative embodiment, these actions include (1) 'E'=keep the original set of VLAN IDs; (2) 'I'=remove intersecting VLAN IDs; (3) 'S'=keep the subset of VLAN IDs; and (4) 'O'=keep the overlap set of VLAN IDs.

TABLE 1

Pseudo-code for Primary VLAN Selection Module

Pseudo-code: Select 'Primary VLAN"
Initialize $F_i$ = 'E' (initialize a flag)
Initialize $T_i = P_i$ where i = 1 .. n
For each VLAN pool, $P_j$, where j = 1 .. n
  For each VLAN pool $P_i$, where i = 1 .. j-1
Update Fi and Fj to one of the flags as per priority [E/I/S/O] by comparing Ti and Pj
  If Fi == 'I'
    $T_i = T_i - (T_i \cap T_j)$
  Else If $F_i$ == 'S' || 'O' || 'E'
    $T_i = T_i - (T_j \subset T_i)$
  If $F_j$ == 'I'
    $T_j = T_j - (T_j \cap T_i)$
  Else If $F_j$ == 'S' || 'O' || 'E'
    $T_j = T_j - (T_i \subset T_j)$
For each VLAN pool, $P_j$, where j is 1...N
  VLAN_Primary [j].primary_vlan = $T_j$ [0]
  VLAN_Primary [j].vlan_poolname = $P_j$.name Referring to FIG. 5, an exemplary flow diagram of a process conducted for selecting the Primary VLAN for a VLAN pool is illustrated. Initially, as set forth in operation 500, various parameters are initialized. For instance, for computation purposes, temporary VLAN pools (T) are created and set to be equivalent to their corresponding VLAN pools. Also, a first flag (Fi) is set to an Exclusive state ('E') while a counter "j" is set to '1'.

As set forth in operation 505-520, count values are adjusted to selectively control the comparisons between different temporary VLAN pools ($T_i$ & $T_j$) to ensure that comparisons are conducted for all combinations of temporary pools $T_1, \ldots,$ and $T_N$) For instance, where the total number of VLAN pools is equal to three (N=3), temporary VLAN pool comparison is performed as follows: T2 is compared to T1, T3 is compared to T1; and T2 is compared to T3.

More specifically, the Primary VLAN selection process involves a determination as to whether a first count value "j" exceeds the total number (N) of VLAN pools (operation 505). If so, the Primary VLAN selection process ends. However, if the first count value "j" is less than or equal to "N", a second count value "i" is set to '1' and compared to a decremented first count value (j−1) as illustrated in operations 510 and 515. These count value adjustments are used to control which temporary VLAN pools ($T_i$ & $T_j$) are compared and the updating of their flags (Fi & Fj) as set forth in operations 525 and 530.

If i>j−1, an iteration is performed in which "j" is incremented (operation 520) and operations 505-515 are repeated. However, where j≤N and i≤(j−1), a comparison is conducted between the two temporary pools ($T_i$ & $T_j$) and flags corresponding to these temporary pools are set to a state based on the comparison (operations 525 and 530).

If a flag (Fi) associated with temporary pool ($T_i$) is set to 'I', which denotes that VLAN pool $T_i$ possesses common VLAN IDs when compared with VLAN pool $T_j$, the intersecting VLAN IDs are removed from the VLAN pool $T_i$ (operations 535 and 540). If flag (Fi) is not set to 'I' state, any VLAN IDs for VLAN pool $T_j$ that are a subset of $T_i$ are removed from VLAN pool $T_i$ (operation 545). The same operations are repeated for comparison from a perspective of VLAN pool $T_j$ (operations 550, 555 and 560).

Thereafter, the second count value (i) is incremented (operation 565) and the process repeats starting at operation 515. This process continues until all combination of temporary VLAN pools (e.g., $T_1$, $T_2$ & $T_3$) have been compared. Based on such a comparison, any unique VLAN ID remaining for each temporary VLAN pool may be selected as the Primary VLAN (operation 570).

In the event that there are multiple VLAN IDs remaining as part of a temporary VLAN pool, according to one embodiment of the disclosure, a first VLAN ID from the temporary VLAN pool is selected. According to another embodiment, the last VLAN ID from the temporary VLAN pool is selected. According to other embodiments, the VLAN ID having the highest or lowest VLAN ID is selected as the Primary VLAN. According to yet another embodiment of the disclosure, the Primary VLAN may be randomly selected, provided that each VLAN ID is unique for that VLAN pool.

Figure 5:
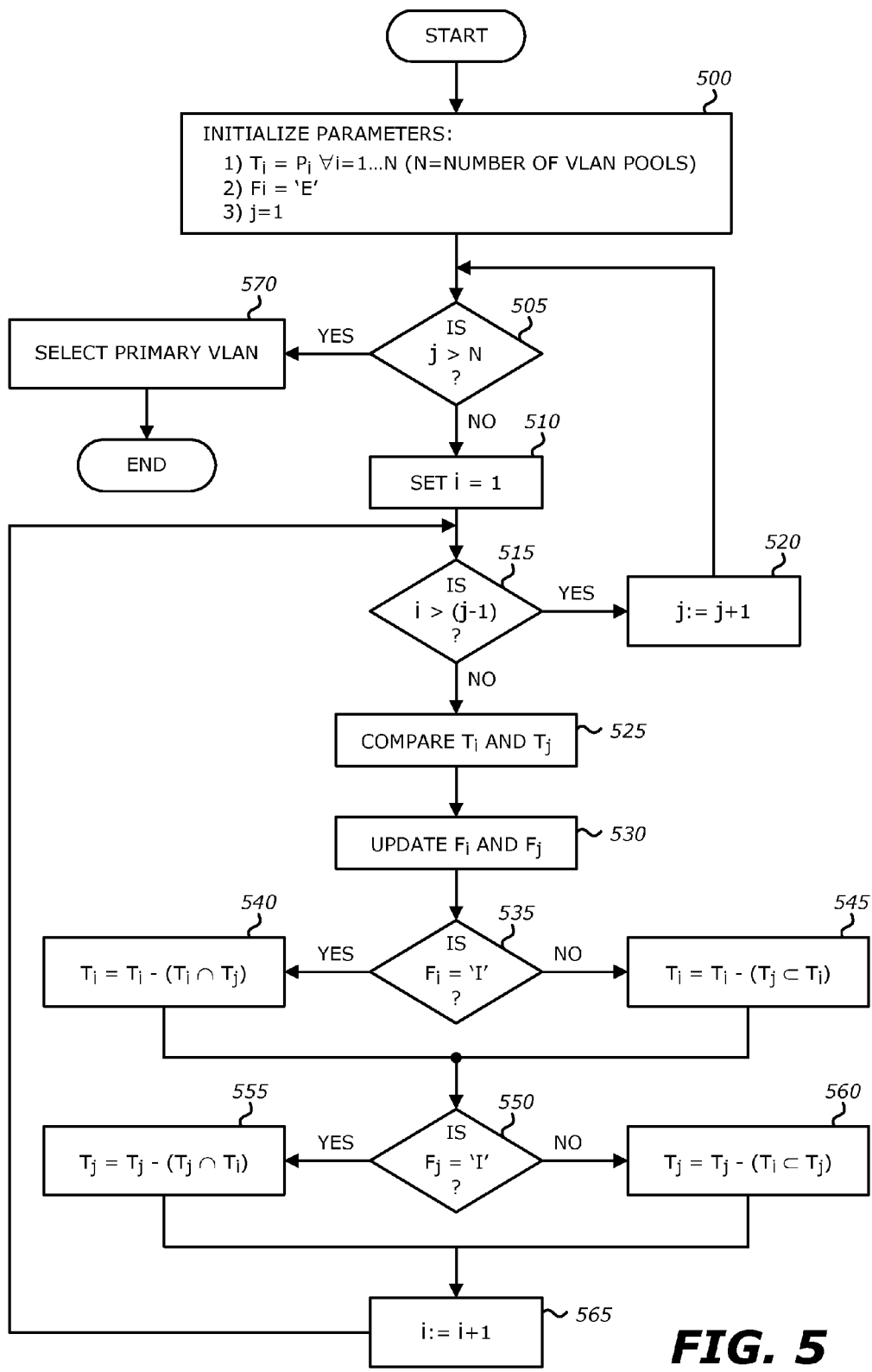
FIG. 5 is an exemplary flow diagram of a selection process conducted for selecting the Primary VLAN for a VLAN pool.

In order to better understand the operations set forth in FIG. 5, an illustrative example will be analyzed to determine Primary VLANs for three VLAN pools ($P_1$, $P_2$ and $P_3$). Herein, as there are three VLAN pools, "N" is equal to 3 so that "j" will range in value from 1 to 3 while "i" will range in value from 1 to "j−1".

Figure 6:
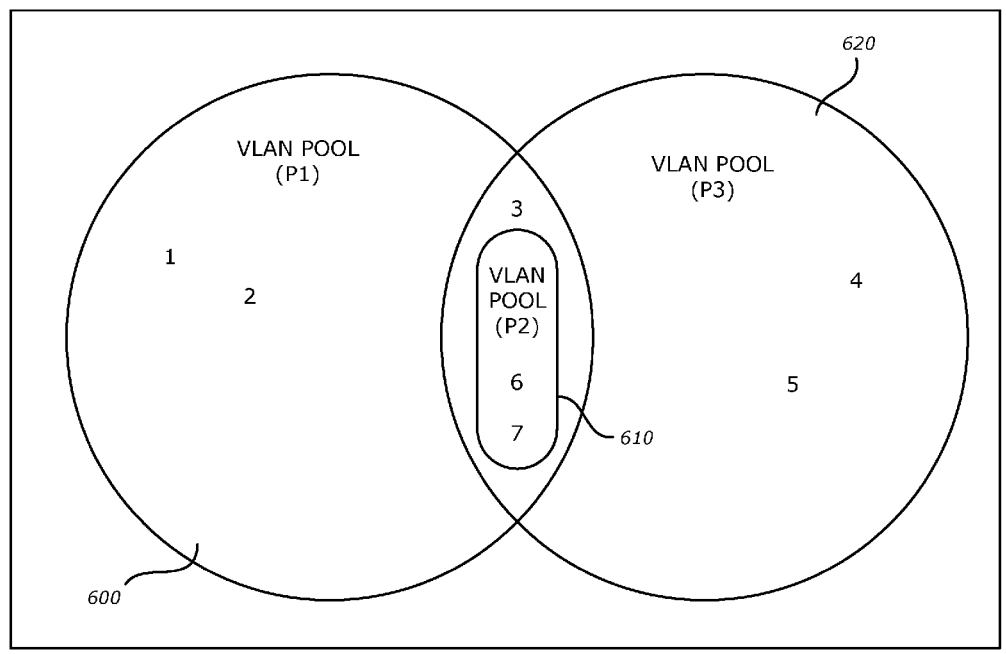
FIG. 6 is an exemplary Venn diagram of an illustrative example for determining Primary VLANs associated with three different VLAN pools.

Herein, each of the exemplary VLAN pools $P_1$ 600, $P_2$ 610 and $P_3$ 620 include VLANs, which are identified by VLAN IDs represented by a simple numerical value (1-7) for illustrative purposes. As set forth in the Venn diagram of FIG. 6, there are seven VLANs in which some of these the VLANs are in multiple VLAN pools:

$P_1$={1, 2, 3, 6, 7}
$P_2$={6, 7}
$P_3$={3, 4, 5, 6, 7}

After temporary VLAN pools $T_1$, $T_2$ & $T_3$ are created to be identical to VLAN pools $P_1$, $P_2$ & $P_3$, for an initial iteration (j=1, i=1) of the Primary VLAN selection process being performed by processing circuitry, the first count value "j" is incremented. Now, "j" is set to "2" and the computational iterations are performed. Between computational iterations, it is contemplated that operations may be performed for adjusting the count values (i, j).

For the first computational iteration (j=2, i=1), the computations resulting from a comparison of $T_2$ & $T_1$ are set forth below.

$P_1 = \{1, 2, 3, 6, 7\}$ F1='I' $T_1 = \{1, 2, 3\}$
$P_2 = \{6, 7\}$ F2='S' $T_2 = \{6, 7\}$

In comparing $T_1$ to $T_2$, it is determined that VLAN Pool $T_1$ possesses some VLAN IDs $\{6, 7\}$ that are included in VLAN Pool $T_2$ and other VLAN IDs $\{1, 2, 3\}$ that are not included in VLAN Pool $T_2$. Hence, the priority state of flag (F1) is set to 'I' as there is an intersection. In response to F1 being set into an 'I' state, the intersecting VLAN IDs are removed, and thus, VLAN pool $T_1$ will be set as $\{1, 2, 3\}$ for any subsequent iterations.

Similarly, in comparing $T_2$ to $T_1$, it is determined that all VLAN IDs $\{6, 7\}$ within VLAN Pool $T_2$ are included in VLAN Pool $T_1$ $\{1, 2, 3, 6, 7\}$. Hence, the priority state of flag (F2) is set to 'S' as VLAN Pool $T_2$ is a subset of VLAN pool $T_1$. The resultant action performed by the Primary VLAN selection process is to keep the subset of VLAN IDs so VLAN pool $T_2$ remains as $\{6, 7\}$.

For the second computational iteration (j=3, i=1), the computations resulting from a comparison of $T_3$ & $T_i$ are the following:

$P_1 = \{1, 2, 3, 6, 7\}$ F1='I' $T_1 = \{1, 2\}$
$P_2 = \{6, 7\}$ F2='S' $T_2 = \{6, 7\}$
$P_3 = \{3, 4, 5, 6, 7\}$ F3='I' $T_3 = \{4, 5, 6, 7\}$

In comparing $T_3$ to $T_1$, it is determined that VLAN Pool $T_3$ possesses some VLAN IDs $\{3\}$ that are included in VLAN Pool $T_{11}$ $\{1, 2, 3\}$ while other VLAN IDs $\{4, 5, 6, 7\}$ are not included in VLAN Pool $T_1$. Hence, the priority state of flag (F3) is set to 'I' as there is an intersection. The action is for removal of intersecting VLAN IDs so VLAN pool $T_3$ will be set as $\{4, 5, 6, 7\}$.

Similarly, in comparing $T_1$ to $T_3$, it is determined that VLAN Pool $T_1$ possesses a VLAN ID $\{3\}$ that is included in VLAN Pool $T_3$ and other VLAN IDs $\{1, 2\}$ are not included in VLAN Pool $T_3$. Hence, the priority state of flag (F1) remains at 'I' as there is an intersection. The action is for removal of intersecting VLAN IDs so VLAN pool $T_1$ will be set as $\{1, 2\}$ for any subsequent iterations.

For the third computational iteration (j=3, i=2), the computations resulting from a comparison of $T_2$ & $T_3$ are the following:

$P_1 = \{1, 2, 3, 6, 7\}$ F1='I' $T_1 = \{1, 2\}$
$P_2 = \{6, 7\}$ F2='S' $T_2 = \{6, 7\}$
$P_3 = \{3, 4, 5, 6, 7\}$ F3='I' $T_3 = \{4, 5\}$

In comparing $T_3$ to $T_2$, it is determined that current VLAN Pool $T_3$ possesses some VLAN IDs $\{6, 7\}$ that that are included in VLAN Pool $T_2$ and other VLAN IDs $\{4, 5\}$ are not included in VLAN Pool $T_2$. Hence, the priority state of flag (F3) remains at 'I' as there is an intersection. The action is for removal of intersecting VLAN IDs, so VLAN pool $T_3$ will be set as $\{4, 5\}$ for the next iteration, if necessary.

Similarly, in comparing $T_2$ to $T_3$, it is determined that all VLAN IDs $\{6, 7\}$ within VLAN Pool $T_2$ are included in VLAN Pool $T_3$ $\{4, 5, 6, 7\}$. Hence, the priority state of flag (F2) is set to 'S' as VLAN Pool $T_2$ is a subset of VLAN pool $T_3$. The action is to keep the subset of VLAN IDs so VLAN pool $T_2$ remains as $\{6, 7\}$.

Therefore, for a next iteration j>N (i.e. all comparisons of the temporary VLAN pools have been conducted), one Primary VLAN is selected from each temporary VLAN pool according to whichever selection process is chosen. For instance, if the lowest VLAN ID remaining for a particular temporary VLAN pools ($T_1$, $T_2$ & $T_3$) is used, the Primary VLAN for VLAN pool $P_1$ is selected as VLAN ID "1". Similarly, the Primary VLANs for VLAN pools $P_2$ and $P_3$ are selected as VLAN ID "6" and VLAN ID "4", respectively.

Data Structure Formulation During Network Device Operations

Referring now to FIGS. 3 and 4C, network device 300 generates and populates a third data structure 470 during operation when network device 300 monitors messages received by one or more APs for JOIN or LEAVE messages. This data structure 470 is represented in a table format, and thus, is referred to herein as the "Multicast VLAN table." Of course, other formats besides a table may be used.

From these JOIN and LEAVE messages, Multicast VLAN table 470 is populated to provide a mapping between the multicast group address 480 and its corresponding BSSID 482 and Primary VLAN 484 as shown in a first entry 490. With Primary VLAN 484 representing a VLAN pool, the Group/BSSID duplet 475 is created for determining whether to further populate the Multicast VLAN table 470. An additional field 486 ("Num_Members") maintains a count value to record the number of multicast group members for a particular Group/BSSID duplet.

Operational Flow of VLAN Pooling with Reduced Multicast Message Duplication

Figure 7:
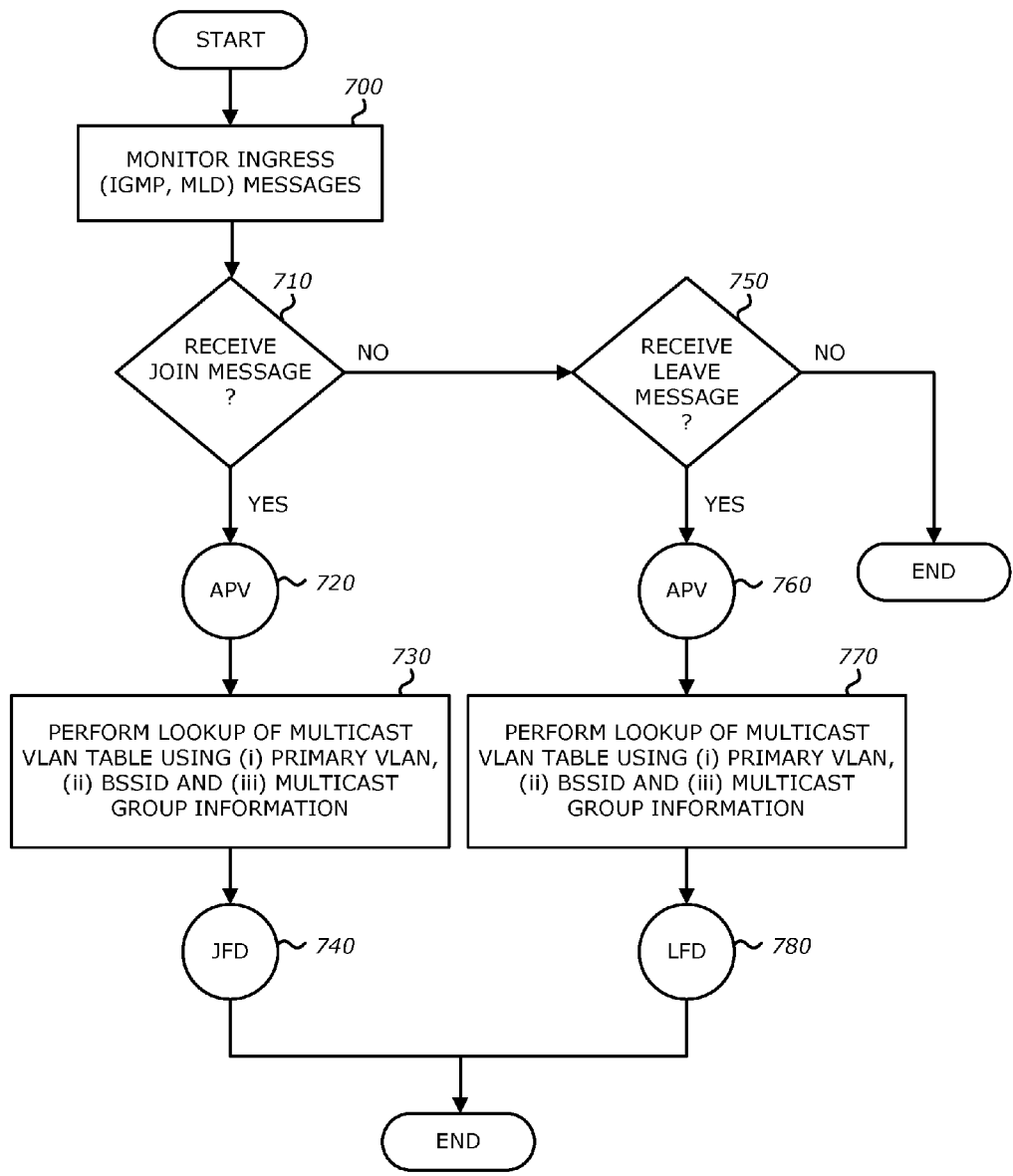
FIG. 7 is an exemplary flow diagram of the operations for formulating and maintaining VLAN pooling with reduced multicast message duplication.

Referring to FIG. 7, an exemplary flow diagram of the operations for formulating and maintaining VLAN pooling with reduced multicast message duplication is shown. For clarity, the operations will be described in accordance with the network infrastructure set forth in FIG. 2A, although deviations from such operations may be conducted depending on the network infrastructure selected.

Initially, a network device with VLAN pooling stream control logic monitors the receipt of certain ingress messages with a selected multicast management protocol such as IGMP, MLD, or the like (operation 700). For instance, upon detecting receipt of a JOIN message (e.g., IGMP JOIN message, MLD JOIN message, etc.), the network device performs an Acquisition Primary VLAN (APV) process as shown in FIG. 8 (operations 710 and 720).

Figure 8:
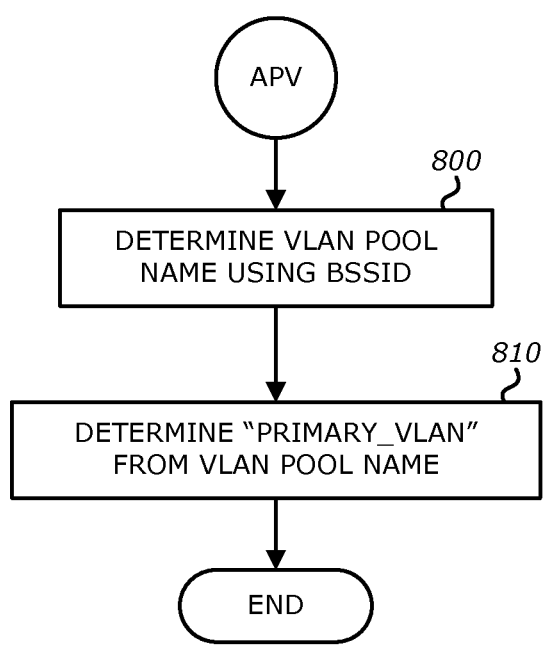
FIG. 8 is an exemplary flow diagram of an Acquisition Primary VLAN (APV) process.

More specifically, as illustrated in FIG. 8, the JOIN message includes a BSSID that is used to obtain a VLAN pool name using VLAN Pool_name table 400 of FIG. 4A (operation 800). VLAN Pool_name table 400 provides a mapping between the BSSID and a corresponding VLAN pool name supported by the BSSID. From the VLAN pool name, a Primary VLAN is determined using Primary VLAN table 440 as shown in FIG. 4B (operation 810). Herein, Primary VLAN table 440 provides a mapping between VLAN pool name and a corresponding Primary VLAN selected for that particular VLAN pool.

Returning back to FIG. 7, the network device performs a lookup of the Multicast VLAN table 470 of FIG. 4C using the Primary VLAN fetched as well as the BSSID and multicast group address extracted from the incoming wireless message including the IGMP JOIN message (operations 730 and 740). As further set forth in FIG. 9, this collection of information, namely a multicast group address (G) and its corresponding Primary VLAN (PV) and BSSID (B) referred to herein as a "G-PV-B triplet," is part of the operations performed by the Join Forwarding decision module 362 of FIG. 3.

Figure 9:
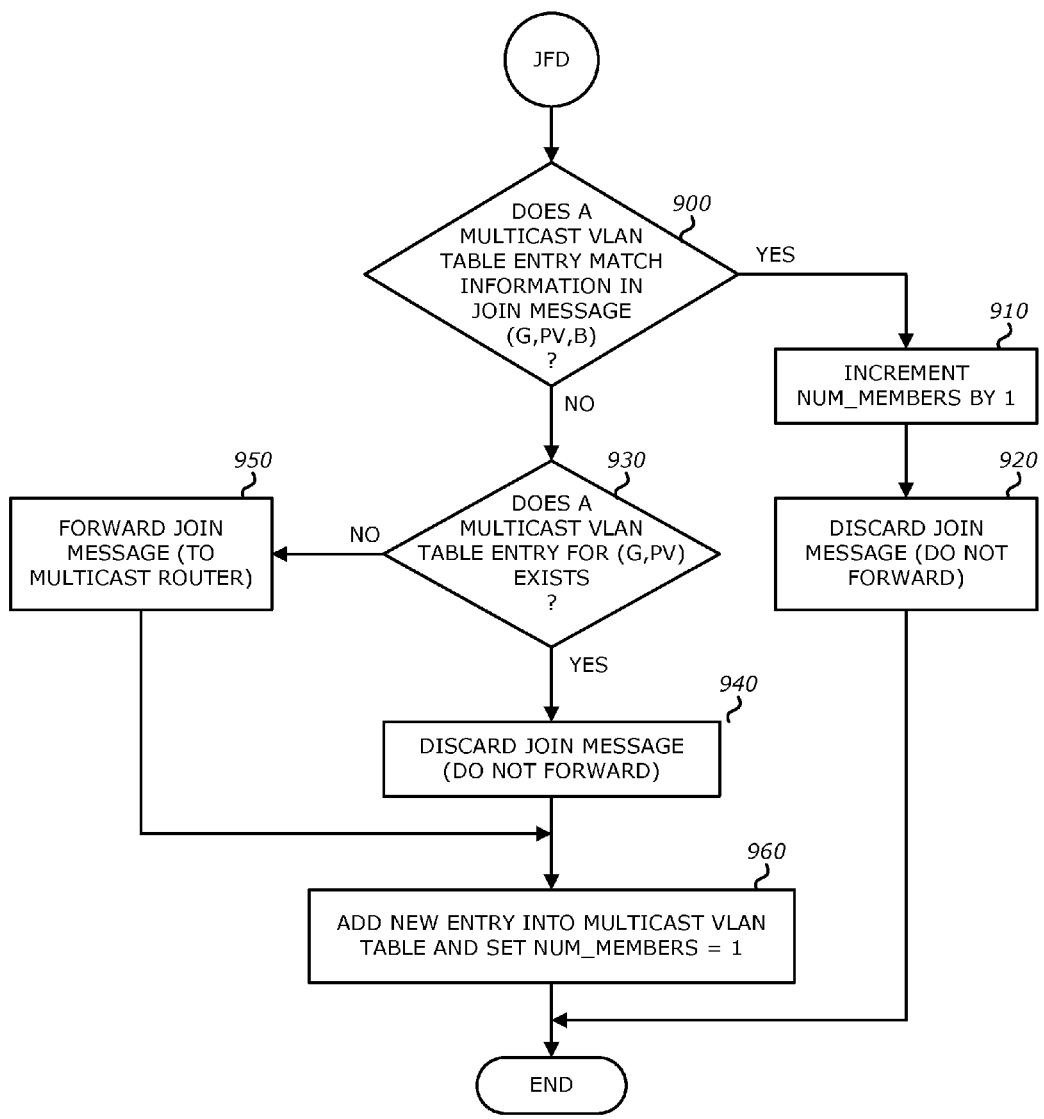
FIG. 9 is an exemplary flow diagram of the operations performed during a JOIN Forwarding Decision process in accordance with the VLAN pooling operations of FIG. 7.

Referring now to FIGS. 4C and 9, the network device first determines if Multicast VLAN table 470 includes an entry with information matching the G-PV-B triplet associated with the incoming JOIN message (operation 900). If an entry is uncovered, the count value in NUM_Members field 486 for that entry is incremented, and the JOIN message is discarded (operations 910 and 920). For example, the JOIN message is not forwarded to the multicast router.

If the network device determines that Multicast VLAN table 470 does not feature an entry with information that matches the G-PV-B triplet, a second determination is made whether Multicast VLAN table 470 includes an entry with information that matches the multicast group address (G) and the Primary VLAN (PV) as illustrated in operation 930. The collection of the multicast group address and the Primary VLAN is referred to as a "G-PV duplet".

If a match is detected, the JOIN message is discarded so that this message is not forwarded to the multicast router (operation 940), however if a match is not detected, the JOIN message is forwarded to the multicast router (operation 950). A new entry is created in Multicast VLAN table 470 that includes the Primary VLAN (PV), the BSSID (B), the multicast group address (G) along with the count value in Num_Members field 486 being set to "1" (operation 960).

Returning back to FIG. 7, if the network device determines that the ingress message is a LEAVE message (operations 700, 710 and 750), the network device performs the Acquisition Primary VLAN (APV) process as shown in FIG. 8 in order to retrieve the Primary VLAN as previously described (operation 760).

Thereafter, the network device performs a lookup of Multicast VLAN table 470 of FIG. 4C using the Primary VLAN (PV) fetched as well as the BSSID (B) and multicast group address (G) included in the wireless message having the IGMP LEAVE message (operations 770 and 780). This lookup using this G-PV-B triplet is part of the operations performed by the Leave Forwarding Decision (LFD) module 364 of FIG. 3 and illustrated in FIG. 10.

Figure 10:
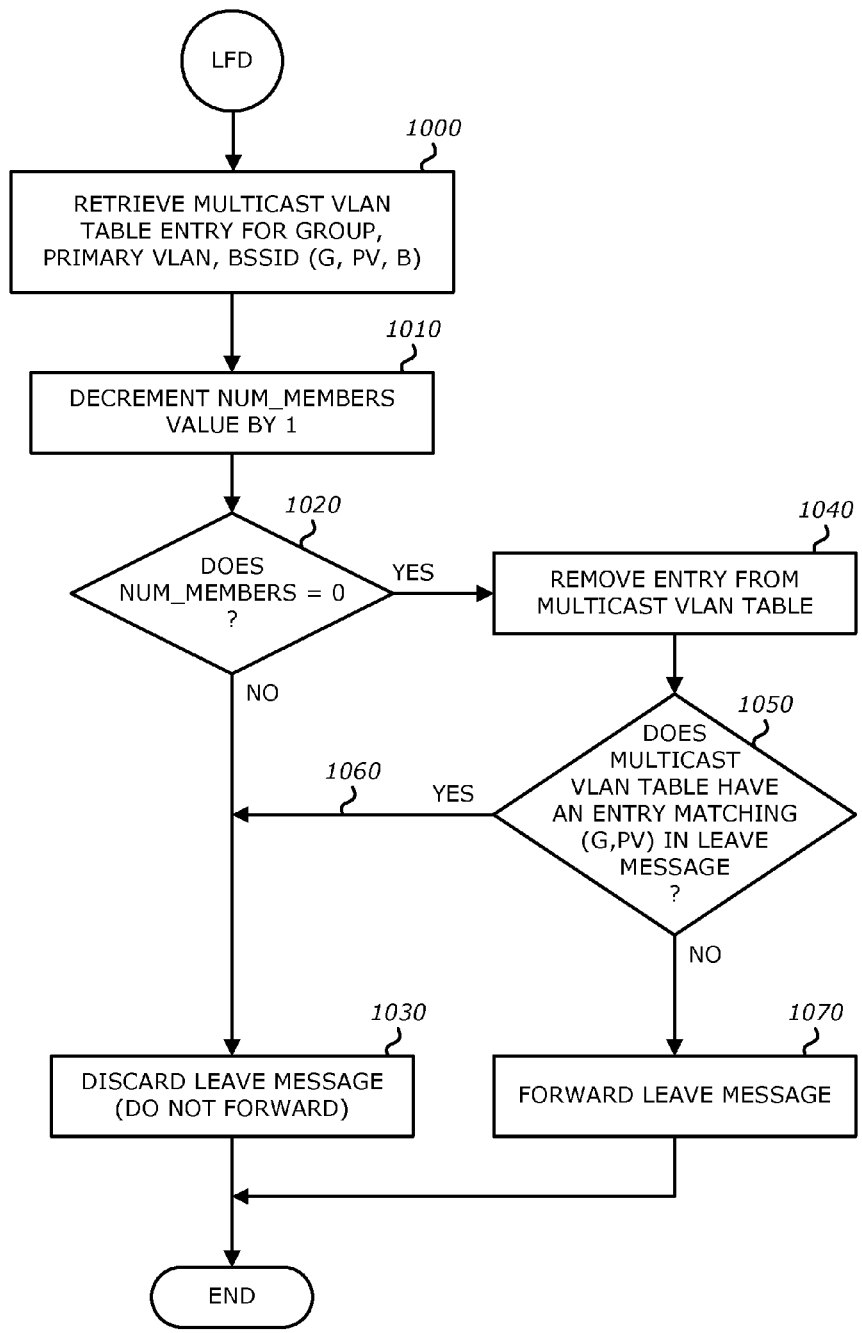
FIG. 10 is an exemplary flow diagram of the operations performed during a LEAVE Forwarding Decision process in accordance with the VLAN pooling operations of FIG. 7.

Referring now to FIGS. 4C and 10, the network device determines if the Multicast VLAN table includes an entry with information matching the G-PV-B triplet (operation 1000). If an entry match is detected, the count value in Num_Members field 486 for that entry is decremented and a determination is made whether the count value is equal to "0" (operations 1010 and 1020).

If the count value in Num_Members field 486 is not equal to "0", the LEAVE message is discarded (operations 1030). As a result, the LEAVE message would not be forwarded to the network device controlling multicast transmissions.

If the count value in Num_Members field 486 is equal to "0", the entry within the Multicast VLAN table is removed (operation 1040). Furthermore, the network device determines whether Multicast VLAN table 470 includes an entry with information matching the multicast group address (G) and the Primary VLAN (PV) (operation 1050). If a match of the G-PV duplet is detected, the LEAVE message is discarded, and therefore, would not be forwarded to the multicast router (operation 1060). Otherwise, the LEAVE message is forwarded to the multicast router (operation 1070).

Illustrative Message Handling by VLAN Pooling Stream Control Logic

Figure 11:
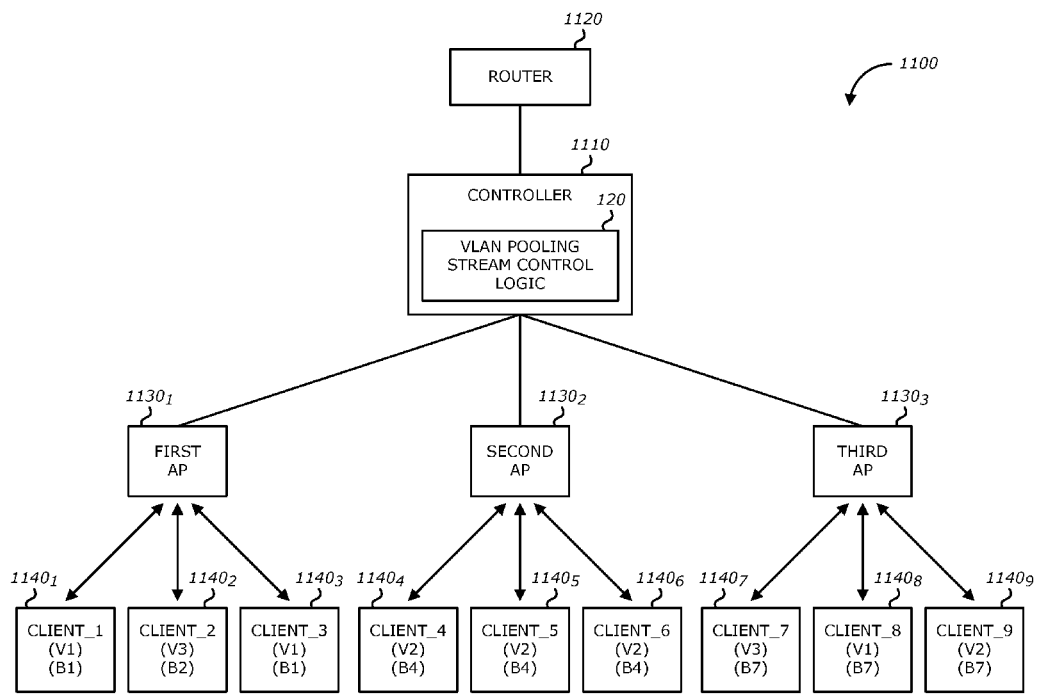
FIG. 11 is an exemplary embodiment of a network deploying VLAN pooling stream control logic within a controller that controls the routing of JOIN and/or LEAVE messages.

Referring to FIG. 11, an exemplary embodiment of a network 1100 deploying VLAN pooling stream control logic 120 within controller 1110 that controls the routing of JOIN and/or LEAVE messages is shown. Herein, network 1100 comprises controller 1110, a multicast router 1120, and a plurality of APs 1130$_1$-1130$_N$. These network devices are equivalent to controller 210, multicast router 220 and APs 200$_1$-200$_N$ of FIG. 2A for illustrative purposes. Other architectures as shown in FIGS. 2C and 2D may be deployed with similar operations.

Herein, a first AP 1130$_1$ is in communications with a first client device 1140$_1$, which belongs to a first VLAN (V1) and a first BSS (B1). Hence, for ease of reference, first client device 1140$_1$ may be represented a "client_1 (V1, B1)." First AP 1130$_1$ also is in communications with a second client device 1140$_2$ belonging to a third VLAN (V3) and second BSS (B2), thereby represented as "client_2 (V3, B2)," and a third client device 1140$_3$ belonging to first VLAN (V1) and first BSS (B1), represented as "client_3 (V1, B1)".

Similarly, second AP 1130$_2$ is in communications with a client_4 (V2, B4) 1140$_4$, a client_5 (V2, B4) 1140$_5$ and client_6 (V2, B4) 1140$_6$. Third AP 1130$_3$ is in communication with a client_7 (V3, B7) 1140$_7$, client_8 (V1, B7) 1140$_8$ and client_9 (V2, B7) 1140$_9$.

According to one embodiment of the disclosure, when a wireless client device on a particular BSSID and VLAN wishes to join a multicast group (Gx), it sends a JOIN message to an AP associated with the wireless circuit device. For this illustrative network infrastructure, the AP routes the JOIN message (or information from the JOIN message) upstream to controller 1110. Controller 1110 obtains a VLAN pool name using the BSSID (Bz) and subsequently learns the Primary VLAN (PVy) for the VLAN pool and executes the JOIN Forwarding Decision module.

Herein, controller 1110 checks if an entry with information identical to the multicast group address (Gx), Primary VLAN (PVy) and BSSID (Bz) exists, namely the "Gx-PVy-Bz triplet". If no entry exists with the Gx-PVy-Bz triplet, controller 1110 adds an entry with "Gx", "PVy" and "Bz" into the Multicast VLAN table and sets count value within Num_Members field to 1, and thereafter, determines if an entry within the Multicast VLAN table exists for "Gx" and "PVy", namely the "Gx-PVy" duplet. If no entry exists with the "Gx-PVy" duplet, the JOIN message (or information contained in the JOIN message) is forwarded to the network device controlling multicast transmissions (e.g., multicast router 1120). Otherwise, if an entry exists with the "Gx-PVy" duplet, the JOIN message is discarded and not forwarded to multicast router 1120.

In contrast, if an entry exists with the Gx-PVy-Bz triplet, controller 1110 increments a count value within the Num_Members field for that entry of the Multicast VLAN table. The JOIN message (or information within the JOIN message) is discarded and not forwarded to multicast router 1120.

As shown in FIG. 12A, when wireless client device 1140$_1$ on VLAN 1 (V1) wishes to join a first multicast group (G1), wireless client device 1140$_1$ sends a JOIN message to AP1 1130$_1$. AP1 1130$_1$ routes information associated with the JOIN message upstream to controller 1110. Based on preconfiguration of controller 1110 in populating VLAN Pool_name table 400 and Primary VLAN table 440 of FIGS. 4A and 4B, the Primary VLAN (PV1) for that BSSID (B1) is retrieved. Thereafter, the JOIN Forwarding Decision module is executed, whereby controller 1110 forwards the JOIN message (or information within the JOIN message such as multicast group address G1 and BSSID B1) to multicast router 1120 and populates a new entry 1200 within Multicast VLAN table 470.

As shown in FIG. 12B, when wireless client device C2 1140$_2$ on VLAN 3 (V3) wishes to join a second multicast group (G2), it sends a JOIN message to AP1 1130$_1$. AP1 1130$_1$ routes information (G2, B2) associated with the JOIN message upstream to controller 1110. Using BSSID B2, the Primary VLAN (PV1) may be retrieved, and thereafter, controller 1110 executes the JOIN Forwarding Decision module to create a new entry 1210 in Multicast VLAN table 470 as there is no entry that matches the G2-PV1-B2 triplet. Thereafter, upon determining that there is no other entry within Multicast VLAN table 470 that matches the G2-PV1 duplet, controller 1110 forwards the JOIN message (or information within the JOIN message such as multicast group address G2 and BSSID B2) to multicast router 1120.

As shown in FIG. 12C, when wireless client device C3 1140₃ on VLAN 1 (V1) wishes to join the first multicast group G1, it sends a JOIN message to AP1 1130₁. AP1 1130₁ routes information associated with the JOIN message (G1, B1) upstream to controller 1110. BSSID B1 is used to retrieve the Primary VLAN (PV1) for that BSSID. Controller 1110 analyzes contents of Multicast VLAN table 470 and executes the JOIN Forwarding Decision module. Since entry 1200 exists by virtue of Client C1 1140₁ previously requesting membership to multicast group address G1, the count value in Num_Members field associated with entry 1200 is incremented and the JOIN message is not forwarded to multicast router 1120.

As shown in FIG. 12D, wireless client device C4 1140₄ on a second VLAN (V2) wishes to join the first multicast group G1 and transmits a JOIN message to AP2 1130₂. AP2 1130₂ routes information associated with the JOIN message upstream to controller 1110. Using BSSID B4, the Primary VLAN (PV2) for the VLAN pool supported by BSSID B4 is retrieved. Controller 1110 analyzes the Multicast VLAN table and executes the JOIN Forwarding Decision module. Hence, as no entry exists in the Multicast VLAN table that features the G1-PV2-B4 triplet, a new entry is added to the Multicast VLAN table with its Num_Members field being set to "1". As no other entry features the G1-PV2 duplet, the Join message is forwarded to multicast router 1120 and a new entry 1220 within Multicast VLAN table 470 is populated.

As shown in FIG. 12E, when wireless client device C5 on second VLAN (V2) wishes to join the first multicast group G1, it sends JOIN message to AP2. AP2 routes the information associated with the JOIN message upstream to controller 1110. After using BSSID B4 in order to fetch the Primary VLAN V2 for the VLAN pool. Controller 1110 executed the Join Forward Decision module that performs an analysis of the contents within the Multicast VLAN table. Hence, upon determining that entry 1220 exists that matches the G1-PV2-B4 triplet, the count value in the Num_Members field for entry 1220 is incremented and the JOIN message is not forwarded to multicast router 1120.

As shown in FIG. 12F, when wireless client device Client C6 on second VLAN V2 wishes to join the first multicast group G1, it sends JOIN message to AP2. AP2 routes the information associated with the JOIN message upstream to controller 1110. After using BSSID B4 in order to fetch the Primary VLAN V2 for the VLAN pool. Controller 1110 executed the Join Forward Decision module that performs an analysis of the contents within the Multicast VLAN table. Hence, upon determining that entry 1220 exists that matches the G1-PV2-B4 triplet, the count value in the Num_Members field for entry 1220 is incremented and the JOIN message is not forwarded to multicast router 1120.

As shown in FIG. 12G, when the wireless client device C7 on third VLAN V3 wishes to join the second multicast group G2, it sends JOIN message to AP3. AP3 routes information associated with the JOIN message upstream to controller 1110. After using BSSID (B7) in order to fetch the Primary VLAN (V1) for the VLAN pool, controller 1110 executed the Join Forward Decision module that performs an analysis of the contents within the Multicast VLAN table. Hence, upon determining that no entry currently exists as there is no match for this particular G2-PV1-B7 triplet, a new entry 1230 within Multicast VLAN table 470 is created and the count value of the Num_Members field for entry 1230 is set to "1". However, since an entry already exists for the G2-PV1 duplet, the JOIN message is not forwarded to multicast router 1120.

As shown in FIG. 12H, when wireless client device C8 on first VLAN V1 wishes to join the second multicast group G2, it sends JOIN message to AP3. AP3 routes the information associated with the JOIN message upstream to controller 1110. After using BSSID B7 in order to fetch the Primary VLAN (V1) for the VLAN pool, controller 1110 executed the Join Forward Decision module that performs an analysis of the contents within the Multicast VLAN table. Hence, upon determining that entry 1230 already exists, the count value in the Num_Members field for entry 1230 is incremented, and thereafter, the JOIN message is not forwarded to multicast router 1120.

As shown in FIG. 12I, when wireless client device C9 on the second VLAN V2 wishes to join the first multicast group G1, it sends a Join message to AP3. AP3 routes the information associated with the JOIN message upstream to controller 1110. After using BSSID B7 in order to fetch the Primary VLAN (V1) for the VLAN pool, controller 1110 executed the Join Forward Decision module that performs an analysis of the contents within the Multicast VLAN table. Upon determining that a corresponding entry (G1-PV1-B7 triplet) in the Multicast VLAN table does not exist, a new entry 1240 is added with its Num_Members field being set to "1". However, since entry 1210 already exists for the G1-PV1 duplet, the JOIN message is not forwarded to multicast router 1120.

According to one embodiment of the disclosure, when a wireless client device on a particular BSSID and VLAN wishes to leave a multicast group (Gx), it sends a LEAVE message to its AP. For this network infrastructure, the AP sends information associated with the LEAVE message upstream to controller 1110. Controller 1110 obtains a VLAN pool name using the BSSID (Bz) from the LEAVE message and subsequently learns the Primary VLAN (PVy) for the VLAN pool and executes the LEAVE Forwarding Decision module.

Herein, controller 1110 confirms an entry in the Multicast VLAN table with information identical to the multicast group address (Gx), Primary VLAN (PVy) and BSSID (Bz) exists. Thereafter, controller 1110 decrements the count value within the Num_Members field. If the count value is equal to zero, the entry is removed from the Multicast VLAN table. Thereafter, the controller determines if a second entry within the Multicast VLAN table exists for the Gx-PVy duplet (Gx, PVy). If no entry exists with the (Gx, PVy) duplet, the LEAVE message (or information contained in the LEAVE message) is forwarded to the network device controlling multicast transmissions (e.g., multicast router 1120). Otherwise, if an entry exists with the (Gx, PVy) duplet, the LEAVE message is discarded and not forwarded to multicast router 1120.

As shown in FIG. 12J, when wireless client device C2 on the third VLAN V3 wishes to leave the second multicast group (G2), it sends a LEAVE message to AP1. AP1 routes the information associated with the LEAVE message upstream to controller 1110. After using BSSID B2 in order to fetch the Primary VLAN PV1 for the VLAN pool, controller 1110 executed the Leave Forward Decision module that performs an analysis of the contents within the Multicast VLAN table. Upon determining that entry 1210 in Multicast VLAN table 470 exists and the Num_Members field="0" after decrementing, the entry is removed from the Multicast VLAN table. However, since entry 1230 already exists for the G2-PV1 duplet, the LEAVE message is not forwarded to multicast router 1120.

As shown in FIG. 12K, when wireless client device C4 on the second VLAN V2 wishes to leave the first multicast group G1, it sends a LEAVE message to AP2. AP2 routes the information associated with the LEAVE message upstream to controller 1110. After using BSSID B4 in order to fetch the Primary VLAN (PV2) for the VLAN pool, controller 1110 executes the Leave Forward Decision module that performs an analysis of the contents within the Multicast VLAN table.

Upon determining that entry 1220 in Multicast VLAN table 470 exists and the count value for the Num_Members field is equal to "2" after decrementing, entry 1220 remains within the Multicast VLAN table and the LEAVE message is not forwarded to multicast router 1120.

As shown in FIG. 12L, when wireless client device C5 on the second VLAN V2 wishes to leave the first multicast group G1, it sends a LEAVE message to AP2. AP2 routes the information associated with the LEAVE message upstream to controller 1110. After using BSSID B4 in order to fetch the Primary VLAN PV2 for the VLAN pool, controller 1110 executes the Leave Forward Decision module that performs an analysis of the contents within Multicast VLAN table 470.

Upon determining that entry 1220 in Multicast VLAN table 470 exists and, after decrementing, the count value for the Num_Members field is equal to "1", entry 1220 remains within Multicast VLAN table 470 and the LEAVE message is not forwarded to multicast router 1120.

As shown in FIG. 12M, when wireless client device C6 on the second VLAN V2 wishes to leave the first multicast group G1, it sends a LEAVE message to AP2. AP2 routes the information associated with the LEAVE message upstream to controller 1110. After using BSSID B4 in order to fetch the Primary VLAN PV2 for the VLAN pool, controller 1110 executes the Leave Forward Decision module that performs an analysis of the contents within Multicast VLAN table 470.

Upon determining that entry 1220 in Multicast VLAN table 470 exists and the count value of Num_Members field is now equal to "0" after decrementing, entry 1220 is removed from Multicast VLAN table 470. Thereafter, a determination is performed as to whether Multicast VLAN table 470 includes an entry with a G1-PV2 duplet. Since no other entry features this duplet, the LEAVE message is forwarded to multicast router 1120.

Multicast Traffic Forwarding

Figure 13:
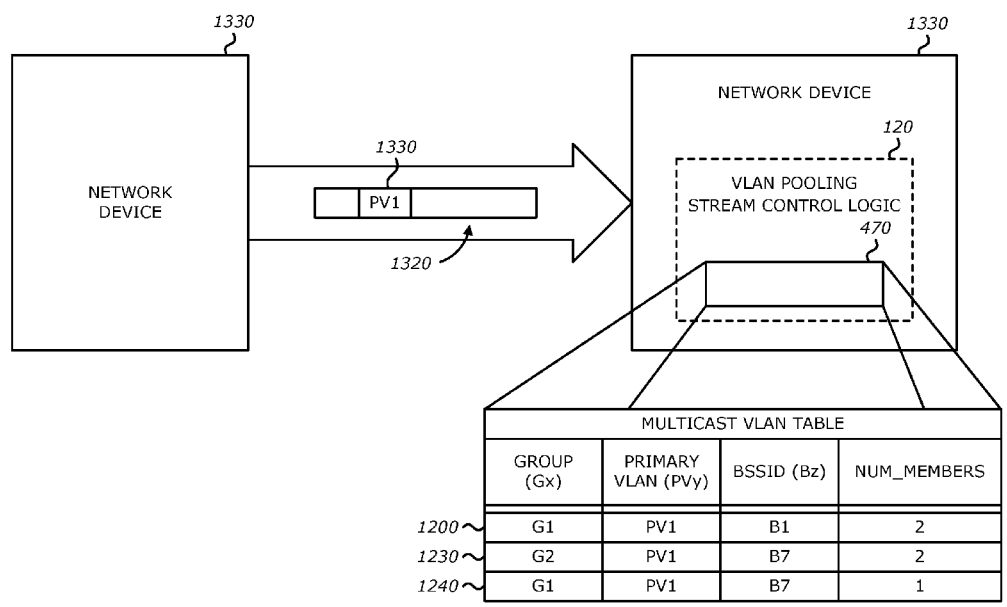
FIG. 13 is an exemplary embodiment of multicast traffic forwarding by a network device.

Referring to FIG. 13, upon a network device 1300, such as controller 210 of FIG. 2A for example, receiving a multicast data stream 1320 from an upstream network device 1310 (e.g. multicast router 220 of FIG. 2A), network device 1300 determines which BSSID is applicable to multicast data stream 1320. This determination may be accomplished using Multicast VLAN table 470 of FIG. 4C.

More specifically, network device 1300 receives multicast data stream 1320 that is directed to a targeted Primary VLAN 1330 (e.g. Primary VLAN "PV1"), and thereafter, determines which entries within Multicast VLAN table 470 feature targeted Primary VLAN 1330. Since Multicast VLAN table 470 is optimized so that each entry, if having the same multicast group (Gx) and Primary VLAN (PVy), requires a different BSSID (Bz), the lookup effectively operates as a mapping of the multicast stream to all associated BSSIDs. As a result, if Multicast VLAN table 470 contains multiple entries for a given multicast group and Primary VLAN, network device 1300 replicates multicast data streams for each of these BSSIDs for subsequent transmission to wireless client devices within these specific BSS.

For instance, continuing the illustrative example as shown in FIGS. 12A-12M by considering Multicast VLAN table 470 having the contents as shown in FIG. 12M, upon receiving a multicast data stream for multicast group (G1) that is directed to a first Primary VLAN (PV1), network device 1300 having access to this Multicast VLAN table would determine that there are two entries 1210 and 1240 directed to PV1. As shown, entry 1210 is associated with a first BSSID (B1) while entry 1240 is associated with a seventh BSSID (B7). Hence, the multicast data stream would be replicated for transmission of two multicast data streams, with one multicast data stream directed to a first BSSID (B1) and the other multicast data stream directed to a seventh BSSID (B7). This multicast forwarding technique ensures that wireless client devices do not receive duplicate multicast streams when in the same BSSID but are associated with different VLANs.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting, by a network device, multicast messages;
   formulating, by the network device, a first data structure to store a plurality of parameters recovered from each detected multicast message, the plurality of parameters include a multicast group address along with a corresponding unique identifier representative of a virtual local area network (VLAN) pool of a plurality of VLAN pools and Basic Service Set Identifier (BSSID);
   receiving an incoming multicast message having an associated multicast group address, a unique identifier representative of a VLAN pool and a BSSID;
   determining that the multicast group address, the unique identifier and the BSSID of the incoming message do not match stored triplets of multicast group address, a unique identifier and a BSSID;
   performing an action based on a further determination of whether the multicast group address and the unique identifier associated with the incoming multicast message match a duplet of the stored multicast group address and the corresponding stored unique identifier; and
   forwarding information within the incoming multicast message to a second network device responsible for transmission of multicast data if the multicast group address and the unique identifier does not match the duplet of the stored multicast group address and the corresponding stored unique identifier.

2. The method of claim 1, wherein the plurality of parameters are a triplet including the multicast group address, the unique identifier and the BSSID contained in an entry of the first data structure.

3. The method of claim 1, wherein the incoming message is discarded when the information within the multicast group address and the unique identifier associated with the incoming message match the duplet of the stored multicast group address and the corresponding stored unique identifier.

4. The method of claim 1, wherein the detecting of the multicast messages comprises detecting a request to join a particular multicast group.

5. The method of claim 4, wherein the request to join the particular multicast group is one of an Internet Group Management Protocol (IGMP) JOIN message.

6. The method of claim 1, wherein the detecting of the multicast messages comprises detecting a request to leave a particular multicast group.

7. The method of claim 1, wherein the action comprises removing intersecting VLAN identifiers in the plurality of VLAN pools.

8. The method of claim 1, wherein the action comprises keeping a subset of VLAN identifiers in the plurality of VLAN pools.

9. The method of claim 8, wherein the subset of VLAN identifiers comprises an overlapped set of VLAN identifiers in the plurality of VLAN pools.

10. The method of claim 1, further comprising:
controlling, by the network device, a forwarding of information within the incoming multicast message to the second network device handling multicast data transmissions, wherein the incoming multicast message is discarded if the information within the incoming multicast message is already stored by the one or more network devices.

11. The method of claim 10, wherein the controlling of the forwarding of information comprises forwarding the information if the information within the incoming multicast message has not been received in a message prior to the incoming multicast message.

12. The method of claim 1, further comprising:
assigning, by the network device, a single unique identifier for each virtual local area network (VLAN) pool of the plurality of VLAN pools utilized within a network.

13. The method of claim 10, wherein the controlling of the forwarding of information comprises:
forwarding the information within the multicast message to a network device handling transmission of multicast data streams if the information within the multicast message differs from information already stored in the data structure.

14. A non-transitory computer-readable storage medium storing embedded instructions that are executed by one or more mechanisms implemented within a network device to perform a plurality of operations comprising:
detecting multicast messages;
formulating a first data structure to store a plurality of parameters recovered from each detected multicast message, the plurality of parameters include a multicast group address along with a corresponding unique identifier representative of a virtual local area network (VLAN) pool of a plurality of VLAN pools and Basic Service Set Identifier (BSSID);
performing an action based on whether a multicast group address and the unique identifier associated with an incoming multicast message match a duplet of the stored multicast group address and the corresponding stored unique identifier, the action being one of removing intersecting VLAN identifiers in the plurality of VLAN pools and keeping a subset of VLAN identifiers in the plurality of VLAN pools; and
forwarding information within the incoming multicast message to a second network device responsible for transmission of multicast data if the multicast group address and the unique identifier does not match the duplet of the stored multicast group address and the corresponding stored unique identifier.

15. The non-transitory computer-readable storage medium of claim 14, wherein the plurality of parameters are a triplet including the multicast group address, the unique identifier and the BSSID contained in an entry of the first data structure.

16. The non-transitory computer-readable storage medium of claim 14, wherein the incoming message is discarded when the information within the multicast group address and the unique identifier associated with the incoming message match the duplet of the stored multicast group address and the corresponding stored unique identifier.

17. The non-transitory computer-readable storage medium of claim 14, wherein the detecting of the multicast messages comprises detecting one of a request to join a particular multicast group and a request to leave the particular multicast group.

18. The non-transitory computer-readable storage medium of claim 17, wherein the request to join the particular multicast group is one of an Internet Group Management Protocol (IGMP) JOIN message and a Multicast Listener Discovery (MLD) JOIN message.

19. The non-transitory computer-readable storage medium of claim 14, wherein the subset of VLAN identifiers comprises an overlapped set of VLAN identifiers in the plurality of VLAN pools.

20. The non-transitory computer-readable storage medium of claim 14, wherein the plurality of operations further comprises:
controlling a forwarding of information within the incoming multicast message to the second network device handling multicast data transmissions, wherein the incoming multicast message is discarded if the information within the incoming multicast message is already stored by the one or more network devices.

21. The non-transitory computer-readable storage medium of claim 20, wherein the controlling of the forwarding of information comprises:
forwarding the information if the information within the incoming multicast message has not been received in a message prior to the incoming multicast message; and
forwarding the information within the multicast message to a second network device handling transmission of multicast data streams if the information within the multicast message differs from information already stored in the data structure.

22. The non-transitory computer-readable storage medium of claim 14, wherein the plurality of operations further comprises:
assigning a single unique identifier for each virtual local area network (VLAN) pool of the plurality of VLAN pools utilized within a network.

23. A network device comprising:
a memory;
a processor being configured to perform operations comprising:
detecting multicast messages;
formulating a first data structure to store a plurality of parameters recovered from each detected multicast message, the plurality of parameters include a multicast group address along with a corresponding unique identifier representative of a virtual local area network (VLAN) pool of a plurality of VLAN pools and Basic Service Set Identifier (BSSID);
performing an action based on whether a multicast group address and the unique identifier associated with all incoming multicast message match a duplet of the stored multicast group address and the corresponding stored unique identifier, the action being one of removing intersecting VLAN identifiers in the plurality of VLAN pools and keeping a subset of VLAN identifiers in the plurality of VLAN pools; and forwarding information within the incoming multicast message to a second network device responsible for transmission of multicast data if the multicast group address and the unique identifier does not match the duplet of the stored multicast group address and the corresponding stored unique identifier.

24. The method of claim 12, wherein assigning a single unique identifier for a virtual local area network (VLAN) pool further comprises:

selecting randomly, by the network device, the single unique identifier for the virtual local area network (VLAN) pool from a plurality of unique identifiers that uniquely identify each VLAN in the VLAN pool.

* * * * *